UNITED STATES PATENT OFFICE.

CHESTER E. ANDREWS, OF PITTSBURGH, PENNSYLVANIA, ASSIGNOR TO THE SELDEN COMPANY, OF PITTSBURGH, PENNSYLVANIA, A CORPORATION OF DELAWARE.

GREEN SULFUR DYE AND PROCESS OF MAKING SAME.

1,314,929. Specification of Letters Patent. Patented Sept. 2, 1919.

No Drawing. Application filed February 27, 1918. Serial No. 219,445.

*To all whom it may concern:*

Be it known that I, CHESTER E. ANDREWS, a citizen of the United States, residing at Pittsburgh, in the county of Allegheny and State of Pennsylvania, have invented certain new and useful Improvements in Green Sulfur Dyes and Processes of Making Same, of which the following is a specification.

The present invention relates to a new class of green coloring matters and to the processes of producing the same.

The new coloring matters are conveniently produced by melting para amino phenol or its homologues or simple derivatives, with amino cymene or nitro cymene or preferably with compounds of these materials, such as the aceto compounds, together with sulfur, at a temperature of from 200 to 300° C. In the melting, a diluent may be employed, in order to moderate the reaction somewhat, as for example glycerin, cresols, anthracene, naphthalene and analogous substances. The coloring matters produced are suitable for direct dyeing of cotton, to produce fast green shades.

To more fully illustrate the invention, the following examples are given.

Example 1: 40 pounds of para amino phenol, 40 pounds of acetyl amino cymene and 160 pounds of sulfur are melted together in a vessel provided with a stirring mechanism, at a temperature of 210–230° until the evolution of hydrogen sulfid nearly stops. The mixture is then pulverized and is dissolved, for example by boiling with a solution in 50 gallons of water, of 50 pounds of caustic soda lye of 40° Bé. The solution is then acidified, or is treated with sodium bicarbonate or similar reagent, to precipitate the dye. The dye is then filtered, pressed, dried and pulverized and forms a brownish-black powder, difficultly soluble in water, soluble in dilute alkai solution with a dark green color, easily soluble in sodium sulfid solution with a brownish color.

Example 2: 125 pounds of the coloring matter produced as in Example 1, are dissolved in 100 gallons of boiling water, with the addition of 125 pounds of sodium sulfid. The solution is evaporated to dryness and the product pulverized. In a hot bath containing sodium sulfid and sodium chlorid or sodium sulfate, the dye is readily soluble, and this bath dyes unmordanted cotton a light olive shade, which is turned by means of an oxidizing agent, (such as the oxygen of the air, hydrogen peroxid, sodium bichromate, copper sulfate and iron chlorid) into a brilliant light green shade of great fastness.

Example 3: 40 pounds of para amino phenol, 40 pounds of nitro cymene and 160 pounds of sulfur are mixed with 30 pounds of glycerin, and are melted as described in Example 1, and further treated as in the manner described therein. The coloring matter obtained has substantially the same properties as that produced in said example.

In the above mentioned examples, para amino phenol may be replaced by other similar bodies, such as para amino cresol (1-methyl-2-hydroxyl-5-amino benzene) and similar compounds. The products produced by such treatment have substantially the same properties as those above described.

The quantities of materials employed in the examples above mentioned may be varied more or less, and the temperature may be varied between about 200 and about 300° C.

The products produced possess particular advantages over the analogous compounds produced from anilin, in that they are more brilliant and more fast.

Acetyl amino cymene has the formula:

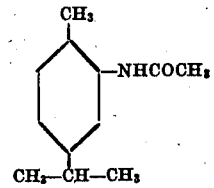

In the appended claims it is understood that the expression "amino-cymene" is intended to cover as an equivalent material; nitro-cymene.

I claim:

1. The herein described new sulfur dyes, derived from a para amino-hydroxy-aromatic compound and nitrogen-containing derivatives of cymene by sulfurization, said dyes being soluble in alkaline solution, soluble in a solution of alkali metal sulfids and being capable of dyeing unmordanted cotton in an alkaline bath.

2. A new sulfur dye, derived from para-amino-phenol and acetyl-amino-cymene by sulfurization, said dye being soluble in water solutions of alkali and of alkali metal sulfids, and being capable of dyeing unmordanted cotton, olive shades, which are turned green by oxidation.

3. The herein described process of making a sulfur dye which comprises the step of melting together a para amino-hydroxy-aromatic body and an amino derivative of cymene with sulfur.

4. The herein described process of making a sulfur dye which comprises the step of heating together acetyl-amino-cymene, para-amino-phenol and sulfur.

5. The herein described process of making a sulfur dye which comprises heating a mixture of 40 parts of para amino phenol, 40 parts of acetyl amino cymene and 160 parts of sulfur, to a temperature of about 210 to 230° C., until the evolution of hydrogen sulfid nearly stops, pulverizing the product and mixing with caustic soda solution to dissolve the same, and thereafter precipitating the dye by the addition of an acid-acting reagent.

In testimony whereof I affix my signature.

CHESTER E. ANDREWS.